Figure 1:
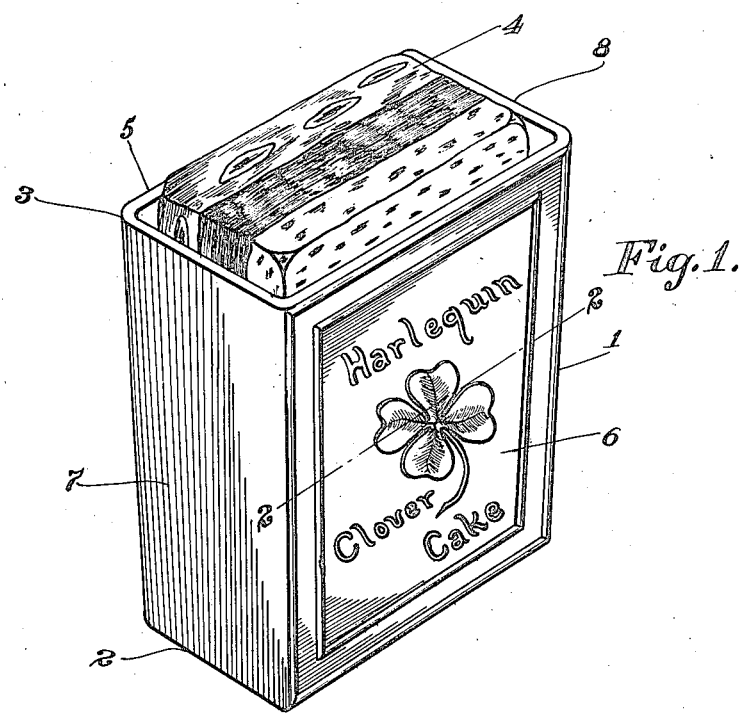

L. V. JOHNSON & O. H. BENSON.
EDIBLE CONTAINER.
APPLICATION FILED OCT. 14, 1916.

1,214,168.

Patented Jan. 30, 1917.

Witnesses:
Porter H. Flauth
Alice J. Donegan

Inventors
Otis Harper Benson
and
Leonard Vernon Johnson
By Edwin P. Samuels
Attorney

UNITED STATES PATENT OFFICE.

LEONARD VERNON JOHNSON AND OTIS HARPER BENSON, OF ST. MICHAELS, MARYLAND.

EDIBLE CONTAINER.

1,214,168. Specification of Letters Patent. Patented Jan. 30, 1917.

Application filed October 14, 1916. Serial No. 125,530.

*To all whom it may concern:*

Be it known that we, LEONARD VERNON JOHNSON and OTIS HARPER BENSON, citizens of the United States of America, and residents of St. Michaels, Talbot county, State of Maryland, have invented certain new and useful Improvements in Edible Containers, of which the following is a specification.

The use of an edible cone as a receptacle for an order of ice cream is well known. Such cones are used by practically all small dealers who sell cheap ice cream which is handled in bulk as distinguished from that which comes in small hard pressed rectangular blocks which are usually separately wrapped, and each of which contains one order of ice cream. These blocks are sometimes of a single flavoring; more often, they are made up of a mixture of several different flavors and colors and are known as "harlequin" blocks.

While the cones adapted to be filled each with a measure of soft ice cream sold in bulk are popular with the trade which patronizes the small confectionery stores and country groceries, they are not acceptable for use at private entertainments where various people not experienced in such matters fill the cones, nor do they meet the requirements of the large soda fountains and other distributers whose customers require a higher grade of commodity more temptingly served. Under such circumstances, the block ice cream is much more easily sold and in all instances it is more easily handled as it comes all wrapped and measured. The objection to it is on the ground that hitherto it was necessary to serve the block ice cream with dish and spoon which must be washed and dried fast enough to meet the demands of the customers. This circumstance not only puts a limit on the speed with which service may be accomplished but raises a question of sanitation as it is difficult to sterilize the ware with sufficient rapidity to meet the demands of rush hours at a popular soda fountain, or the crowd that must be served at various entertainments.

With these facts in view, the applicants have devised an edible container for block ice cream which eliminates the necessity for washing both dishes and spoons. The wrapped blocks sold by most dealers are of uniform size or may easily be so made and obtained. For convenience in handling the blocks, which are always rectangular, the applicants have devised a cake container which is also rectangular and preferably slightly tapered so as to give it some draft, and of dimension such that it fits snugly over the ice cream blocks with only a slight clearance and makes it possible to handle the blocks with convenience and comfort and with no considerable chance of spilling any of the contents of the container.

To give the heat applied in cooking easy access to the dough and to give the cake a pleasing appearance, various raised patterns may be introduced and the container may be made of any preferred cake, as nabisco and the like.

In the accompanying drawing, we have shown an edible ice cream block container constructed in accordance with my invention.

Figure 2:
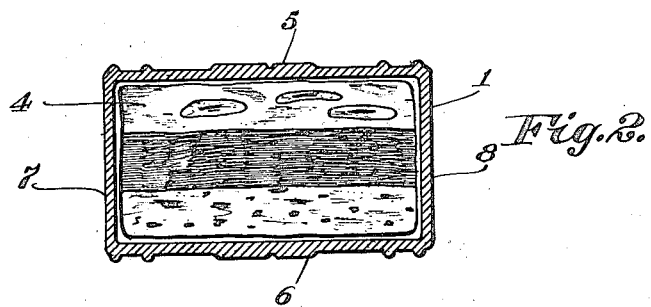

Figure 1 is a perspective view of the container with a block of ice cream; and Fig. 2 is a horizontal section.

The drawing shows a container 1 of approximately a rectangular form, preferably being slightly tapered from the bottom 2 to the top 3, the top dimensions being larger than the corresponding bottom dimensions so as to give the container draft and make it easy to remove from the mold.

As has been already pointed out, the container is of dimensions to receive the article known in the trade as a harlequin block, of course including blocks of single flavor, of the size in which they come wrapped ready for serving. The ice cream block in the present instance is indicated by reference character 4. As shown, in the preferred form of the invention, the block has about a quarter of an inch clearance all around.

The cake may be made corrugated or given any pleasing design, as shown.

For convenience in removing the cake from the mold, preferably the two opposite surfaces 5 and 6 only are made corrugated, the other two sides 7 and 8 being plain.

The cake may be of any constituency. It is referred to in the claims as baked and pressed or molded and pressed, this meaning that the baking process is practically completed within the mold and that the cake rises or swells to fit the mold producing a product which is not dense or solid but porus and at the same time may be referred to as pressed in that the surfaces conform to the surfaces of the mold and are ordinarily slightly confined by the mold in baking.

The terms molded and baked or pressed and baked serve to distinguish from the doughnut-like cakes formed by dipping an internal mold or former in dough and then dipping it in hot fat until the dough adhering to the mold becomes partly baked and is disengaged from the mold and the cooking completed by boiling or frying in the fat.

This cake is not pastry in the ordinary sense of the term which means pie-crusts and the like consisting principally of grease and flour, but a dry cake.

The manner of serving has already been fully discussed.

We have thus described our invention specifically and in detail in order that its nature and operation may be fully understood; however, the specific terms herein are used descriptively rather than in their limiting sense and the scope of the invention is defined in the claims.

We claim:

1. An edible container for ice cream of pressed cake and of rectangular form to receive and fit the commercial single order rectangular ice cream block.

2. In combination, a commercial single order rectangular ice cream block and an edible container for the same of molded and baked cake, the container being of substantially rectangular cross section to fit the block and slightly tapered as to its vertical section.

Signed by us at St. Michaels, Talbot county, Maryland, this 11th day of October, 1916.

LEONARD VERNON JOHNSON.
OTIS HARPER BENSON.

Witnesses:
CURTIS B. SEWELL,
E. K. SMITH.